(No Model.)

J. J. MELVILLE.
DIRT LOADING MACHINE.

No. 273,121. Patented Feb. 27, 1883.

WITNESSES:
Chas. Nida.
C. Sedgwick.

INVENTOR:
J. J. Melville
BY
ATTORNEYS.

N. PETERS, Photo-Lithographer, Washington, D. C.

UNITED STATES PATENT OFFICE.

JAMES J. MELVILLE, OF NEW YORK, N. Y.

DIRT-LOADING MACHINE.

SPECIFICATION forming part of Letters Patent No. 273,121, dated February 27, 1883.

Application filed September 29, 1882. (No model.)

*To all whom it may concern:*

Be it known that I, JAMES J. MELVILLE, of the city, county, and State of New York, have invented a new and useful Improvement in Dirt-Loading Machines, of which the following is a full, clear, and exact description.

Reference is to be had to the accompanying drawings, forming part of this specification, in which similar letters of reference indicate corresponding parts in all the figures.

Figure 1:
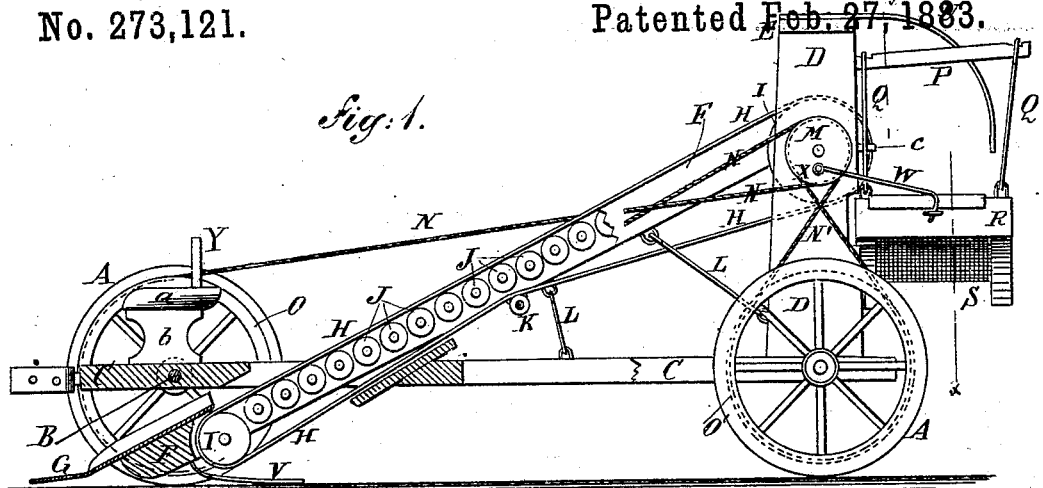
Figure 2:
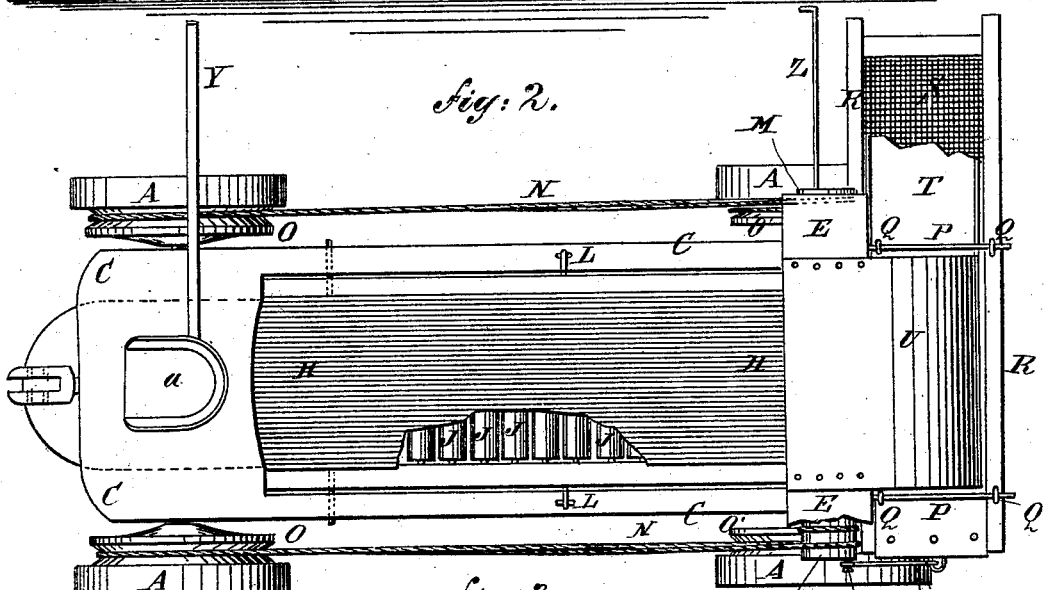
Figure 3:
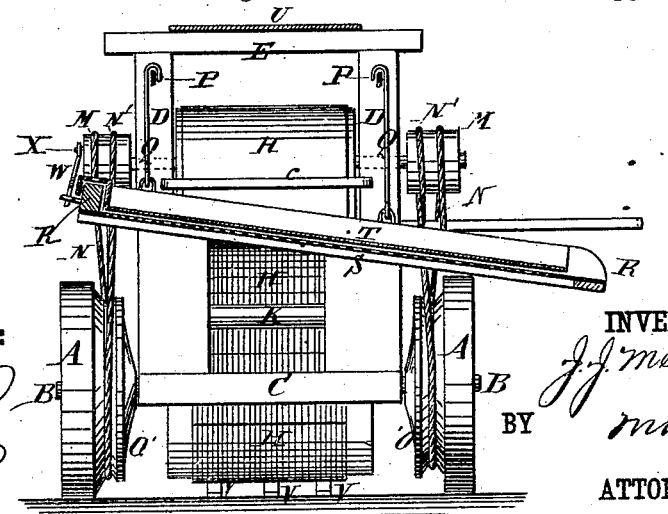

Figure 1 is a side elevation, partly in section, of my improvement. Fig. 2 is a plan view of the same, parts being broken away. Fig. 3 is a sectional rear elevation of the same, taken through the line $x\ x$, Fig. 1.

The object of this invention is to facilitate the loading of dirt, gravel, and other substance into wagons and carts; and to this end the invention consists in the peculiar construction and arrangement of parts, as hereinafter fully described, and pointed out in the claims.

A represents four wheels, of equal size, to the axles B of which is attached a frame, C.

To the rear part of the frame C are attached two uprights, D, the upper ends of which are connected by a cross-bar, E.

To the forward part of the frame C and the upper part of the frame D E is attached an inclined frame, F, the forward end of which is close to the ground beneath the forward part of the frame C, and has a metal plate, G, attached to it, to serve as a shovel or scoop to separate the dirt from the ground. The scoop G has flanges along its side edges to prevent the dirt from passing off at its sides and guide the said dirt to the endless apron H, which passes around rollers I, journaled to the upper and lower parts of the frame F. The upper part of the endless apron H passes over a series of rollers, J, journaled to the frame F, to support it, and its load while passing up the frame F. The lower part of the endless apron H passes over a roller, K, journaled to supports attached to the lower side of the middle part of the frame F to prevent the said lower part of the endless apron from sagging. The frame F is strengthened against the weight of the dirt being carried up it by the endless apron H by braces L, attached to the said frame, and to the frame C and uprights D.

To the journals of the upper roller, I, are attached double pulleys M, around which pass belts N N'. The belts N N' are crossed to cause them to carry the endless apron H in the proper direction, and are passed around pulleys O O', attached to or formed upon the inner sides of the wheels A, so that the endless apron H will be operated by the advance of the machine.

To the rear side of the upper part of the uprights D are attached two rearwardly-projecting arms, P, upon which are hooked the upper ends of four rods, Q, the lower ends of which are connected with a frame, R, so as to suspend the said frame R at the rear end of the machine. The frame R is provided with a screen, S, and with a removable bottom, T, covering the said screen, and is suspended in an inclined position, so that the dirt discharged into it from the endless apron H will slide down the said bottom T into a wagon or cart drawn at the side of the machine; or, if desired, the frame R can be suspended in such a position as to discharge the dirt into a wagon or cart placed at and connected with the rear end of the machine.

To the bar E, attached to the upper ends of the uprights D, is attached a plate, U, which is curved downward and rearward, so as to serve as a guard or shield to prevent the dirt discharged from the endless apron H from passing over the rear side of the frame R.

To the rear sides of the uprights D are attached the forwardly-bent ends of a bar, c, so that the said bar will cross the endless apron H and serve as a scraper to remove any soil that may adhere to the said apron.

To the lower side of the lower end of the frame F are attached a number of bars, V, which are curved downward and rearward to serve as runners to support and give steadiness to the lower end of the said frame.

In using the machine a furrow is turned with a plow and the machine is drawn along the said furrow, which causes the dirt to pass up the scoop G to the endless apron H, by which it is carried up and discharged into the chute R T, down which it slides to the wagon or cart.

The machine can also be used for separating small stones from the soil, in which case the bottom T is removed from the frame R, so that the fine soil will fall through the screen S to the ground, while the stones will slide down the said screen to the receiving wagon or cart.

The machine can also be used for harvesting potatoes and other root-crops, the soil falling back to the ground and the potatoes being delivered into the wagon or cart.

When the machine is to be used for separating stones and potatoes from the soil the frame R is agitated by a rod, W, one end of which is hooked into a staple or other support attached to the upper edge of the frame R, and its other end is pivoted to a crank-pin, X, attached to the pulley M.

To the forward part of the frame C is attached the end of a rod, Y, which projects outward for the horses that draw the wagon or cart to be attached to, and to the rear part of the machine is attached a rod, Z, for the wagon or cart to be connected with, so that the said wagon or cart will be kept close to the side of the machine.

$a$ is the driver's seat, the standard $b$ of which is attached to the forward part of the frame C.

Having thus described my invention, what I claim as new, and desire to secure by Letters Patent, is—

1. In a dirt-loading machine, the combination, with frame D and the endless apron H, of the double pulleys M, the pulleys O O', and the belts N N', substantially as herein shown and described.

2. In a dirt-loading machine, the combination, with the frame A B C D, of the inclined frame F, provided with the scoop G and the runners V at its forward end, the endless apron H, and means for operating said apron from both sets of wheels, substantially as herein shown and described.

3. In a dirt-loading machine, the combination, with the frame A B C D and the endless apron H, of the double pulley M, the pulleys O O', the belts N N', the suspended frame R, and the rod W, connected to said frame R and to a crank-pin, $x$, on the double pulley M, substantially as herein shown and described.

4. In a dirt-loading machine, the combination, with the suspended frame or chute R S, of the bottom T, having its upper end formed hook-shaped to hook over the upper cross-bar of the said frame, substantially as herein shown and described.

5. In a dirt-loading machine, the combination, with the frame C D E, of the laterally-projecting rods Y Z, substantially as herein shown and described, whereby the receiving wagon or cart can be kept close to the side of the machine, as set forth.

JAMES J. MELVILLE.

Witnesses:
JAMES T. GRAHAM,
C. SEDGWICK.